Patented May 2, 1933

1,906,580

UNITED STATES PATENT OFFICE

IVAN GUBELMANN, HENRY J. WEILAND, AND OTTO STALLMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

ORGANIC ACIDS OF THE DIPHENYLMETHANE SERIES AND A PROCESS OF PREPARING THE SAME

No Drawing.      Application filed January 2, 1929.   Serial No. 329,946.

This invention relates to 3'-amino- and nitrogen substituted 3'-amino-4'-substituted-6'-halogen benzyl ortho benzoic acids and to a process of preparing these bodies by the halogenation of the corresponding 3'-amino- and nitrogen substituted 3'-amino-4'-substituted benzyl ortho benzoic acids.

It is an object of this invention to provide a method whereby these products may be made technically available, as they are valuable products in themselves and more particularly so in connection with the manufacture of dyestuffs.

Other and further important objects of this invention will become apparent from the following description and appended claims.

The bodies to which this invention relates have the following general constitution:

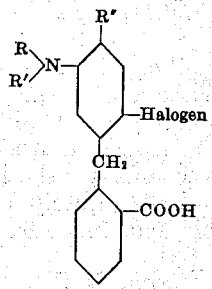

wherein R and R' both represent hydrogen, or wherein R and R' together stand for the diacyl radical of a dibasic organic acid such as the phthaloyl residue, or wherein R stands for hydrogen while R' stands for an acidyl radical such as acetyl, benzoyl, toluenesulfonyl, the group

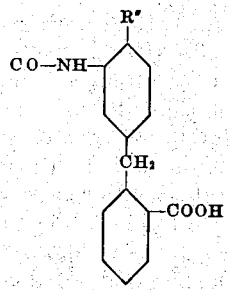

(R'' having the same significance as below, the compound in this case being a substituted urea), and similar groups; wherein R'' is a hydrogen, methyl, methoxy, ethoxy, halogen, carboxyl, sulfonic acid and the like, and halogen is a chlorine or bromine atom.

Among the products which we include in our invention are the following and their acidyl nitrogen substituted derivatives:

3'-amino-4'-methoxy-6'-bromo ortho benzyl benzoic acid
3'-amino-4'-chloro-6'-chloro ortho benzyl benzoic acid
3'-amino-4'-chloro-6'-bromo ortho benzyl benzoic acid
3'-amino-4'-methoxy-6'-chloro ortho benzyl benzoic acid
3'-amino-4'-ethoxy-6'-bromo ortho benzyl benzoic acid
3'-amino-4'-methyl-6'-chloro ortho benzyl benzoic acid
3'-amino-4'-methyl-6'-bromo ortho benzyl benzoic acid
3'-amino-4'-ethoxy-6'-chloro ortho benzyl benzoic acid The 4'-position may be substituted by other groups and the above list is given merely to illustrate the type of compounds referred to.

We have found that the 3'-amino-4'-substituted benzyl benzoic acids, which are the subjects of our copending applications, Serial Nos. 290,027 and 290,028, filed July 2nd, 1928, may be readily halogenated using methods adapted for the halogenation of similar aniline derivatives. The halogen for the most part enters the para position to the amino group. In the halogenation of these bodies, we prefer to use as starting material an acidyl derivative, as for example, an acetyl-amino.

The 6'-halogen acetyl amino bodies thus obtained may then be hydrolyzed to the 3'-amino-6'-halogen benzyl benzoic acids by generally known methods adapted to similar compounds or they may be used as such for the preparation of other compounds suitable for dyestuffs.

In the preparation of some of the acidyl derivatives, it is more practical to start with the halogenated amines obtained from the acetyl-amino-4'-substituted bodies by hydrolysis and treat them with various acidylating agents as for example, phthalic anhydride, phosgene, benzoyl chloride and the like, by known methods adapted for the preparation of other acidyl amino bodies.

The halogenation may be performed in a variety of ways and in its preferred form depends largely upon the individual starting material employed. In the chlorination we employ either chlorine as such, or a chlorinating agent, such as sulfuryl chloride, $SO_2Cl_2$. The chlorination may also be effected by the use of chlorinating agents such as bleaching powder and acid. The brominations are usually carried out by the use of bromine itself. Catalyzers may be used, but in general the reaction runs so smoothly that they are not considered necessary or advisable.

The halogenated acidyl bodies obtained are in general quite similar to the starting material in physical appearance. They are white to cream colored solids, depending upon the purity. When pure, they are practically white. They are soluble in dilute caustic soda, ammonia and sodium carbonate solutions, but practically insoluble in water. They can be hydrolyzed to the 3'-amino-4'-substituted -6'-halogen benzyl benzoic acids, which in physical properties resemble the unhydrolyzed bodies. These bodies may be condensed with suitable condensing agents to the corresponding anthrones which upon oxidation give the corresponding anthraquinones. The anthraquinones produced thereby are the 1-amino-4-halogen-2-substituted anthraquinones, the importance of the latter being well known.

To illustrate the preferred embodiments of our invention the following examples are given. The proportions are in parts by weight.

*Example I*

50 parts of 3'-amino-4'-methoxy benzyl ortho benzoic acid, which may be prepared by reducing 3'-amino-4'-methoxy benzoyl ortho benzoic acid with zinc dust and ammonia, are added to 150 parts of glacial acetic acid. There are then added 50 parts of acetic anhydride and the mixture is heated to the boiling point for ten minutes. 12 parts of water are added and the mixture cooled to about 25° C. 35 parts of bromine in 50 parts of acetic acid are now added over a period of about one hour. The 3'-acetyl amino-4'-methoxy-6'-bromo benzyl ortho benzoic acid crystallizes out and is filtered off. It is washed with a little acetic acid and dried. It may be recrystallized from acetic acid and then has a melting point of 228 to 229° C. Upon hydrolyzing this compound with diluted caustic soda the 3'-amino-4'-methoxy-6'-bromo benzyl ortho benzoic acid can be obtained. The latter body has a melting point of 189–190° C.

*Example II*

50 parts of 3'-amino-4'-chloro benzyl ortho benzoic acid, which may be obtained by reducing 3'-amino-4'-chloro benzoyl ortho benzoic acid with zinc dust and ammonia, are added to 200 parts of glacial acetic acid and 50 parts of acetic anhydride. The mixture is heated to reflux temperatures for a short time. It is then cooled to 90–100° C. and there are then added over a period of one hour 30 parts of sulfuryl chloride, $SO_2Cl_2$. The mixture is cooled to room temperature and filtered. The product is washed with a little acetic acid and dried. After recrystallizing from acetic acid, the product 3'-acetyl-amino-4', 6'-dichloro benzyl ortho benzoic acid has a melting point of 246–247° C. It can be hydrolyzed to the free base of melting point 164–165° C.

*Example III*

3'-amino-4'-methoxy-benzyl-ortho-benzoic acid can be halogenated as in Example I, except that instead of using bromine, chlorine is used. The 3'-acetyl-amino-4'-methoxy-6'-chloro-benzyl ortho benzoic acid has a melting point of 226° C. Upon hydrolyzing this product there is obtained a base of melting point 190° C.

*Example IV*

3'-amino-4'-methoxy benzyl ortho benzoic acid can be chlorinated as in Example III, except using as starting material 3'-amino-4'-methoxy benzyl benzoic acid in the place of 3'-amino 4'-methoxy benzyl ortho benzoic acid. The 3'-acetyl-amino-4'-ethoxy-6'-chloro benzyl ortho benzoic acid melts at 219–220° C.

*Example V*

60 parts of 3'-amino-4'-methyl benzyl ortho benzoic acid (melting point 157° C.), which may be prepared by reducing 3'-amino-4'-methyl benzoyl ortho benzoic acid with zinc dust and ammonia, are added to 150 parts of glacial acetic acid and 50 parts of acetic anhydride. This mass is heated to reflux temperatures for 10 minutes. 20 parts of water and 500 parts of glacial acetic acid are then added, and at a temperature of 90–100° C. over a period of 1 to 2 hours, 45 parts of bromine in 50 parts of glacial acetic acid. The mass is cooled to room temperature, filtered and the filter cake washed with a little glacial acetic acid. The melting point of 3'-acetyl-amino-4'-methyl-6'-bromo benzyl ortho benzoic acid is 246° C. Upon hydrolysis the acetyl body is transformed into a base of melting point 193–194° C.

Example VI 60 parts of 3'-amino-4'-methyl benzyl ortho benzoic acid are added to 150 parts of glacial acetic acid and 50 parts of acetic anhydride. The mass is refluxed for about 10 minutes and cooled to 90–100° C. 300 parts of glacial acetic acid are now added, and at 90–100° C., 35 parts of sulfuryl chloride ($SO_2Cl_2$) are added over a period of 1 to 2 hours. The mass is cooled to room temperature and filtered. The filter cake is washed with a small amount of acetic acid and dried. The melting point of 3'-acetyl-amino-4'-methyl-6'-chloro benzyl benzoic acid is 256° C. Upon hydrolysis a base is obtained having a melting point of 196–197° C.

Example VII

Into 200 parts of nitrobenzene are added 50 parts of 3'-amino-4'-methoxy-6'-chloro benzyl ortho benzoic acid as obtained in Example III and 50 parts of phthalic anhydride. The mixture is heated to the boiling point and distilled until free of water. It is then cooled to room temperature, whereupon the phthaloyl body crystallizes out. 100 parts of alcohol are now added and the product is filtered off, washed with a small amount of alcohol to free the body of nitrobenzene. The product can be easily crystallized from nitrobenzene or glacial acetic acid in the form of white crystals.

Example VIII

To 400 parts of water are added 50 parts of p-toluene-sulfon-chloride. The mixture is heated to 70 to 80° C. and there is added sufficient caustic soda solution to give a weak alkalinity on brilliant yellow paper. To this mixture is then added over a period of one hour a solution of the sodium salt of 3'-amino-4'-methyl-6'-chloro benzyl ortho benzoic acid containing 50 parts of the latter body and prepared as in Example VI above. Heat the mixture to the refluxing temperature and hold at this temperature for 2 to 3 hours. The product is filtered off hot and washed with a small amount of hot water. 3'-para-toluene sulfonamido-4'-methyl-6'-chloro benzyl ortho benzoic acid thus obtained can be recrystallized from glacial acetic acid in the form of white crystals.

Example IX

To 400 parts of water add 50 parts of 3'-amino-4'-methyl-6'-chloro benzyl ortho benzoic acid as prepared in Example VI and just sufficient caustic soda solution to give an alkaline test on brilliant yellow paper. Now add to this solution at a temperature of 20–25° C. 50 parts of benzoyl chloride and just sufficient caustic soda solution to maintain a slight alkalinity of the solution and allow to react about ½ hour. Acidify the solution with a mineral acid and filter off the precipitated body. 3'-benzoyl-amino-4'-methyl-6'-chloro-benzyl ortho benzoic acid as thus obtained is a white powder. It can be recrystallized from alcohol in the form of white crystals.

We are aware of the fact that instead of using the acetyl derivatives for the preparation of these bodies, other nitrogen substituted derivatives, as for example benzoyl, toluene sulfonyl, carbonyl-amino-benzyl-ortho-benzoic acid, phthaloyl and the like may be employed. Similarly we are aware that other solvents may be used, as for example, nitrobenzene and other halogenating agents. The improvement residing in this invention is in the fact that practically all the halogen introduced into the molecule enters in the 6'-position, thereby producing compounds which after condensation and oxidation are valuable anthraquinone derivatives. This rule fails but in rare cases.

In the claims where the term "an amino" or "a 3'-amino" is used, we mean to include both free amino and acidyl amino groups, and wherein the term "acidyl" is used we means to include both radicals of monobasic and dibasic organic acids.

We are aware that numerous details of the process may be varied through a wide range without departing from the principles of this invention, and we, therefore, do not purpose limiting the patent granted hereon otherwise than necessitated by the prior art.

We claim as our invention:

1. The process which comprises treating with halogenating agents in the presence of a protecting agent for any free amino groups a benzyl-ortho-benzoic acid being substituted in the 3'-position by an amino group of the type

wherein R and R' both represent hydrogen, or wherein R and R' together stand for a diacyl radical of a dibasic organic acid, or wherein R stands for hydrogen while R' stands for an acidyl radical.

2. The process which comprises reacting 3'-acidyl-amino-ortho-benzyl benzoic acids with a halogenating agent.

3. The process which comprises reacting 3'-acidyl-amino-ortho-benzyl benzoic acids in the presence of a solvent with a halogenating agent.

4. The process which comprises halogenating in the presence of acetic acid 3'-acetyl-amino-benzyl-ortho-benzoic acids substituted in the 4' position with a member of the groups consisting of alykyl, alkoxy, halogen, carboxyl, and sulfonic acid group, and hydrolyzing the product.

5. As new articles of manufacture bodies of the following formula:

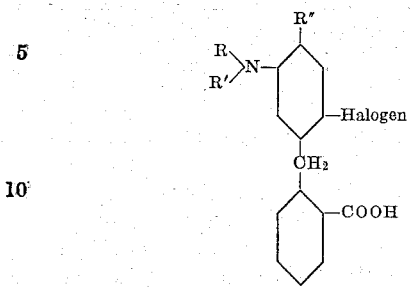

wherein R and R' represent two hydrogen atoms, one hydrogen atom and an acidyl group, or the diacyl radical of a diabasic organic acid; R" represents a member of the group consisting of alkyl, alkoxy, halogen, carboxyl and sulfonic acid groups, and "halogen" stands for a chlorine or bromine atom.

6. As new articles of manufacture, 3'-acidyl-amino 6'-halogen benzyl ortho benzoic acids substituted in the 4'-position with a member of the group consisting of alkyl, alkoxy, halogen, carboxyl, and sulfonic acid groups.

7. The process which comprises heating a 3'-amino-benzyl-ortho-benzoic acid substituted in the 4'-position with a member of the group consisting of alkyl, alkoxy, halogen, carboxyl, and sulfonic acid groups in the presence of a protecting agent for the amino group, cooling the solution, slowly adding thereto a halogenating agent and filtering the resulting precipitate.

8. The process which comprises heating a 3'-amino-benzyl-ortho-benzoic acid substituted in the 4'-position with a member of the group consisting of alkyl, alkoxy, halogen, carboxyl, and sulfonic acid groups in the presence of acetic acid, cooling the solution, slowly adding thereto a halogenating agent and filtering the resulting precipitate.

9. The process which comprises heating a 3'-amino-benzyl-ortho-benzoic acid substituted in the 4'-position with a member of the group consisting of alkyl, alkoxy, halogen, carboxyl, and sulfonic acid groups and acetic acid to boiling, cooling the solution to approximately room temperatures, slowly adding thereto a halogenating agent and filtering the resulting precipitate.

10. The process of preparing a 3'-acetyl-amino - 6' - chloro - benzyl-ortho-benzoic acid substituted in the 4'-position with a member of the group consisting of alkyl, alkoxy, halogen, carboxyl, and sulfonic acid groups which comprises treating a 3'-acetyl-amino-4'-substituted-benzyl-ortho-benzoic acid with a chlorinating agent.

11. The process of forming 3'-acetyl-amino-4'-alkoxy-6'-chloro-benzyl-ortho-benzoic acid which comprises treating 3'-acetyl-amino - 4' - alkoxy-benzyl-ortho-benzoic acid with a chlorinating agent at approximately room temperatures.

12. As new articles of manufacture, bodies of the following formula:

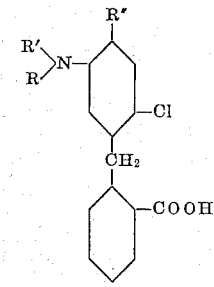

wherein R and R' represent two hydrogen atoms, one hydrogen atom and an acetyl group, or the diacyl radical of a dibasic organic acid and R" represents a member of the group consisting of alkyl, alkoxy, halogen, carboxyl and sulfonic acid groups.

13. As new articles of manufacture, bodies of the following formula:

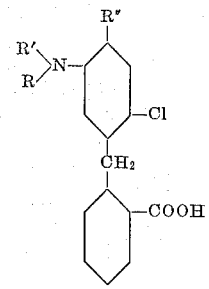

wherein R and R' represent acetyl groups and R" a member of the group consisting of alkyl, alkoxy, halogen, carboxyl and sulfonic acid groups.

14. As new articles of manufacture, 3'-acetyl-amino-6'-chloro-benzyl-ortho-benzoic acids substituted in the 4'-position by a member of the group consisting of alkyl, alkoxy, halogen, carboxyl and sulfonic acid groups.

15. As new articles of manufacture, 3'-acidyl-amino-4'-alkoxy-6'-halogen-benzyl-ortho-benzoic acids.

16. As new articles of manufacture, 3'-acetyl-amino-4'-alkoxy-6'-halogen-ortho-benzyl-benzoic acids.

17. As new articles of manufacture, 3'-acetyl-amino-4'-alkoxy-6'-chloro-benzyl-ortho-benzoic acids.

In testimony whereof, we have hereunto subscribed our names at Carrollville, Milwaukee County, Wisconsin.

IVAN GUBELMANN.
HENRY J. WEILAND.
OTTO STALLMANN.